Figure 3:
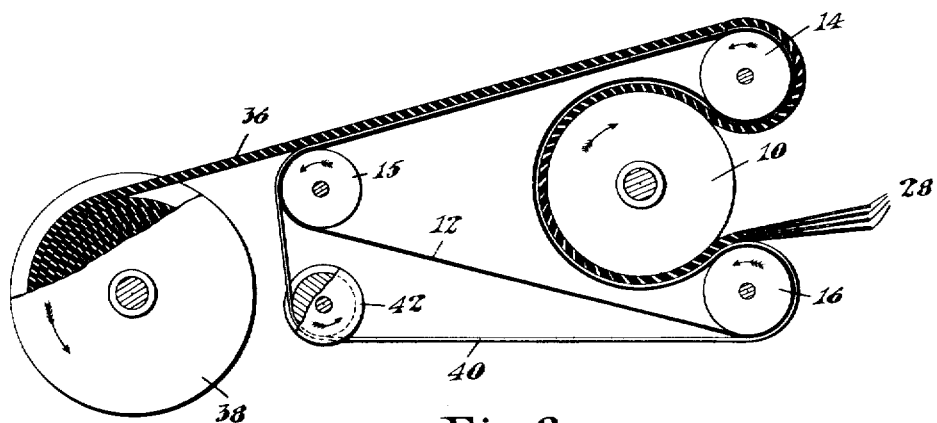

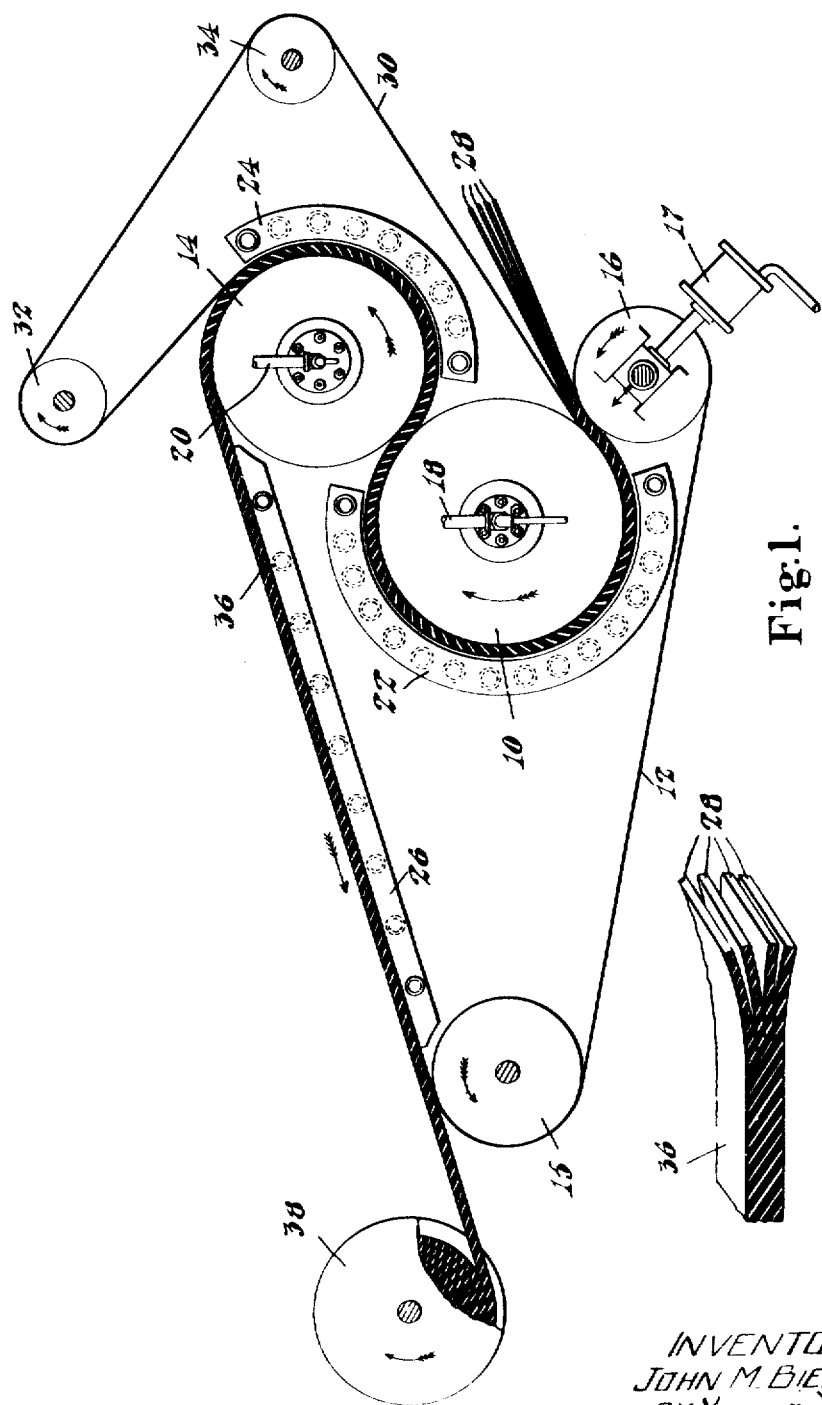

UNITED STATES PATENT OFFICE 2,434,541

MANUFACTURE OF THERMOPLASTIC MATERIALS

John M. Bierer, Waban, Mass., assignor to Boston Woven Hose and Rubber Company, Cambridge, Mass., a corporation of Massachusetts Application March 4, 1944, Serial No. 525,029

7 Claims. (Cl. 18—57)

This invention relates to thermoplastic sheet material of a composition requiring a considerable temperature to effect the bonding of laminated strips thereof into a unit body and in one aspect comprises a novel method of continuously combining thin sheets of such material into a unitary, integral and homogeneous sheet of substantial thickness and particularly well adapted to various commercial uses. More particularly the invention concerns thermoplastic materials of the vinyl type such, for example, as Copolymers of vinyl chloride and vinyl acetate
Polymerized vinyl chloride
Copolymers of vinylidene and vinyl chloride, and
Copolymers of polyvinyl alcohol and an aldehyde.

Various commercial uses require such plastic materials in sheet form and of various widths, lengths and thicknesses. It has been found impossible to calender vinyl resins in sheets of the thickness required for many industrial purposes, and the only way in which satisfactory material has been obtained heretofore is by first calendering sheets to a thickness not exceeding 0.6 inch and then laminating several of these plies to form sheets of the desired thickness. This laminating process has been required since it has not been otherwise possible to calender the material into sheets of thickness greater than about .060 inch without danger of occluding air bubbles in the sheet. Heretofore the thin sheets have been placed in a flat press and heated to a temperature sufficient to cause the sheets to adhere or bond together in face to face contact, the substantial heat required also causing the sheets to bond to the press. The heating has then been continued at a temperature and for a period of time sufficient to relieve or anneal any internal stresses set up in the calendering operation, and then cold water has been admitted to the press to cool the comparatively thick plastic sheet so formed to a temperature at which it can be stripped from the forming surfaces without undue distortion thereof or injury to the sheet surfaces. This final cooling step is important because the warm sheet is soft and easily distorted or pulled apart.

While the above process yields a satisfactory sheet for many purposes, it also has many disadvantages. The process is slow, since each pressing cycle requires heating and cooling of the press, and is expensive particularly in the high consumption of steam, cooling water and hydraulic system water required. Furthermore, the size of plastic sheet which can be thus produced is strictly limited to the size of the press platens since all attempts to form large sheets by feeding the sheets intermittently through the press have resulted in failure because the plastic sheet tends to soften and pull apart at the edges of the press platen during the heating portion of the pressing cycle.

One object of my invention is to make available to the industry a new and improved process for continuously combining and bonding together such thin sheets of thermoplastic material without occluding air bubbles therein, and the continuous annealing, cooling and stripping of the relatively thick sheet thus formed so as to produce uniformly dense and homogeneous sheets or strips of said material of any desired thickness and in any length required, and all at substantially less expense than has been heretofore possible.

In its preferred form my invention contemplates the continuous feeding of the thin component strips longitudinally and simultaneously to and through a predetermined path at the entrance of which the strips are pressed continuously and firmly into face to face contact in a manner excluding the entrapment of air therebetween, the heating of the combined strips to softening temperature by and between pressure surfaces holding the strips in firm face to face contact along said path where they bond into a homogeneous and unitary or integral strip, the continued heating of the unitary strip along said path at a temperature and for a period of time sufficient to relieve the strip of any internal stresses previously set up by the preforming or calendering operations, the cooling of the integral strip while continuing its movement through another predetermined path, and finally the stripping of the finished strip from one or both of said surfaces and rolling it upon itself into a roll without requiring the use of separators or liners therebetween. The invention is applicable to the combining of plastic sheet materials having thermoplastic characteristics and, while I have found that the extending of the heat treating period to affect a substantial annealing for the purpose described results in the production of a superior product, I desire it to be understood that the process of my invention is not to be considered as necessarily including a heating period beyond that required for effectively combining the several thin sheets into a unitary sheet. The production of a unitary and continuous strip sheet of this nature having optimum chemical and physical properties and a uniformly high degree of surface finish, uniformly throughout its length, at very substantial savings in labor and expense comprises a further object of the invention.

Figure 4:
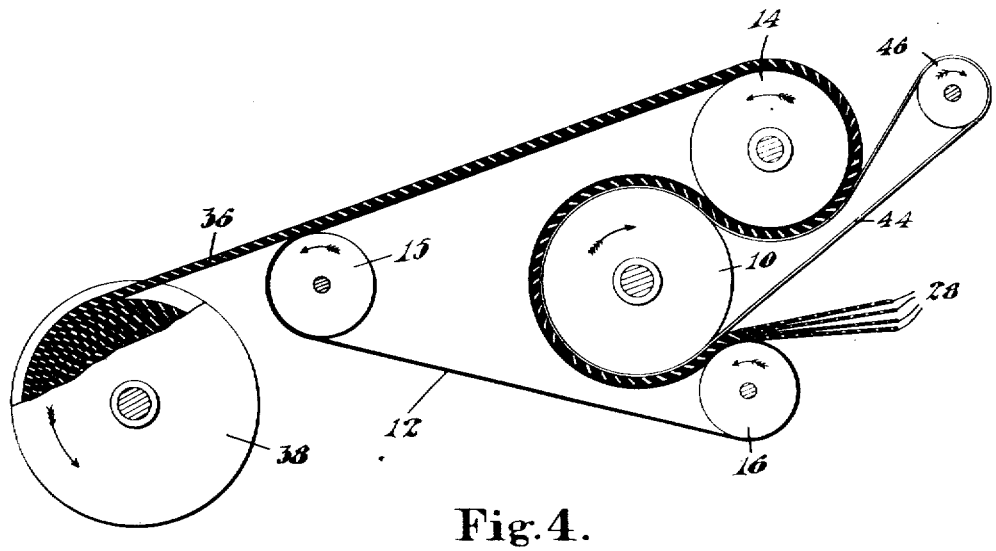

These and other features of the invention will be best understood and appreciated from the following description of a preferred manner of putting it into practice, disclosed in connection with the representative apparatus shown in the accompanying drawing, in which, Fig. 1 illustrates in side elevation one form of apparatus that can be employed in carrying my invention into effect and illustrates one embodiment of the invention, Fig. 2 is a fragmentary view illustrating the laminating step of the process, Fig. 3 illustrates diagrammatically a modified form of apparatus useful in carrying out the method of the invention, and Fig. 4 illustrates a further modified form of apparatus for the same purpose.

The apparatus shown in Fig. 1 of the drawings, and which is herein illustrated as employed in carrying out my invention, comprises a cylindrical drum 10 and a cooperating endless steel band 12 arranged in the manner illustrated and described in Bierer Patent No. 2,039,271. The steel band passes about a substantial arcuate portion of the drum and from thence in a generally triangular path about a drum 14 and rolls 15 and 16. The drum 10 is adapted to be heated by passing steam thereinto through a pipe 18 and the drum 14 is adapted to be cooled by passing cold water thereinto through a pipe 20. A heating jacket 22 extends arcuately about the portion of the drum 10 engaged by the band 12 and a like jacket 24 extends about a portion of the drum 14. The jacket 22 is adapted to be heated by passing steam thereinto and the jacket 24 is adapted to be cooled in like manner by cold water. In some cases it may also be desirable to provide further cooling of the band and a straight water-circulating jacket 26 can be provided beneath and adjacent to a straight portion of the band for such purpose.

The roll 15 is adapted to be adjusted in the direction of the arrow to place the band 12 under the desired tension. The roll 16 is preferably a pressure roll having hydraulic mechanism 17 cooperating therewith for forcing the roll against the band and drum with considerable pressure. This roll can also be steam heated if desired whereby to heat the band 12 and material therebeneath between the band and drum.

A plurality of thin strips or sheets 28 of plastic material to be formed into a continuous unitary strip of substantial thickness are illustrated as being fed in converging relation to the machine and into the bight between the drum 10 and the roll 16. The apparatus can employ a single pressure band 12 in which case the combined strips 28 directly engage the drum 10 at the inner face and are engaged by the band 12 at the outer face. For reasons hereinafter described, it may be desirable in some cases to employ two pressure bands for engaging the material therebetween at both faces and in such case I employ a second steel band 30 supported on rolls 32 and 34 and extending about the drum and roll 14 in cooperation with the band 12. In this case the strips 28 are fed to and between the two bands at the bight between the drum 10 and the roll 16.

In either case the thin strips 28 are pressed firmly together by the action of the pressure roll 16 at a zone extending transversely thereacross as they pass between the drum 10 and roll 16, this action serving to prevent the trapping of air between the strips and join the strips together into intimate face to face contact. The continuous movement of the drum and connected parts in the direction of the arrows carries the combined strips along the drum path beneath the jacket 22. The drum and jacket are heated to the highest practical temperature required to perform the required functions, this temperature ordinarily approximating 275° F. to 350° F. although it may vary with different materials. The first function to be performed is the heat softening of the material to a degree causing the several sheets, under the pressure of the bands 12 and 30, to flow and bond together into a unitary piece. Following this function the unitary strip thus formed must usually be annealed at a temperature and for a sufficient period of time to relieve it of the internal stresses created in the bonding and forming operations. The heating of the strip at both faces and its passage around the drum are so controlled that at the preliminary portion of such travel the thin strips are bonded together and during the remainder of such travel they are annealed for the purpose described.

The treatment above described delivers the unitary strip 36 from the drum 10 at a temperature which renders it subject to distortion if it were immediately removed from the drum and rolled onto a shell for further use and, furthermore, the hot plastic strip if immediately rolled up would tend to adhere to itself and could not be unrolled for use in further manufacturing processes. Also, the heat treatment at the high temperature described usually causes the strip to adhere to the steel bands to such an extent as to distort or injure the strip if removed therefrom in hot condition. My invention therefore contemplates the passage of the thermoplastic strip together with the steel bands from the drum 10 to and around the cooled roll 14 and beneath its jacket 24. During this passage both the bands and strip are cooled to a temperature permitting removal of the strip from the steel band without injury to the strip and permitting coiling up of the product without danger of adhering at the contacting faces.

The band 30 is stripped from the strip 36 after its passage beyond the jacket 24 and the strip thereafter remains in contact with the band 12 during its further passage to the roll 38. If further cooling of the strip is desired before coiling it at 38 such further cooling can be effected by the additional cooling jacket 26 over and in contact with which the band and strip travel. The band 12 is stripped from the strip 36 as the former passes around the roll 15 and the strip is thereupon wound into a coil at 38.

The employment of two bands 12 and 30 engaging both faces of the product permits heating of the product at both faces to the highest practical temperature required even though such temperature causes adhering of the strip to the bands. In some cases it may be desirable to eliminate the band 30 and feed the strips 28 into direct contact with the drum 10. In such instance the drum temperature will usually be kept somewhat lower than the temperature of the jacket 22 to prevent any substantial adhering of the strip to the drum, the combined temperatures of the drum and jacket however being sufficient to perform the bonding and annealing functions required. In this case the strip is stripped from the drum as the strip passes therefrom to the roll 14.

The pressures and temperatures imposed on the product during the treatment should be evenly distributed and the use of press pads for this purpose may be desirable. I have illustrated the employment of such a pad 40 in Figure 3. This pad is endless and passes from a supporting roll 42 over the band 12 on the roll 16 and from thence about the drum between the band and the product 36. The composition of the pad may vary substantially but in any event it should be elastic and yielding so that excess pressure imposed at one point on the pad surface will be transmitted to an adjacent part of the pad where the contact pressure is lower and thence to the material which is being compressed and combined. For most purposes the pad can be made from a ply of textile material such as cotton duck which for this purpose may or may not be treated to prevent its adhesion to the plastic material or, if a thick pad is required, several plies of duck are coated with an adhesive material and combined to form a pad of the required thickness.

As illustrated in Fig. 3 the product is stripped from the drum as the product passes to the roll 14 but the product remains in contact with the pad 40 for a substantially longer time and during which both the pad and product are cooled so that the pad can be readily stripped before the product is rolled up.

In Fig. 4 I have illustrated an endless pad 44 supported on an idler 46 and passing about and in contact with the drum 10. In this case the pad is stripped from the product before the product is thoroughly cooled and for this reason the pad will preferably be treated to prevent adhesion of the product thereto.

It will now be apparent that I have continuously produced a unitary sheet of thermoplastic material of indefinite length and substantial thickness from a plurality of relatively thin sheets of such material and have so joined these thin sheets together progressively and continuously longitudinally thereof as to produce the unitary sheet without the entrapment of air thereinto. I have furthermore so heat treated the product as to flow and bond the thin sheets into a single unitary sheet and annealed the latter to a degree relieving it of the internal stresses created in the forming operation so that it remains in flat condition when stripped from the steel band.

Having thus disclosed my invention and for illustrative purposes described in detail the preferred manner of putting it into effect I claim and desire to secure by Letters Patent:

1. A method of combining into a unitary strip of predetermined thickness a plurality of thin component strips of plastic material adapted to be softened by heat, which comprises the steps of feeding the thin strips longitudinally and simultaneously into and through a bight between and in direct contact with two pressure surfaces to which said material is adherent when heated to a sufficiently high temperature and is sufficiently non-adherent to be stripped therefrom without injury when cooled, pressing the thin strips firmly and progressively into face to face contact at said bight thereby continuously excluding the entrapment of air therebetween while joining them into intimate physical contact, continuing the movement of the combined strips along a predetermined path while holding them in firm face to face contact between said surfaces both of which are heated to temperatures at least sufficiently high to bond the component strips into a unitary strip and at least one surface of which is heated to a temperature sufficiently high to cause adhering of the material thereto, annealing the unitary strip by continuing to maintain it under said heat and pressure through a continuation of said path, continuing the movement of the unitary strip in adhering contact with said one surface through another predetermined path while cooling said one surface and strip sufficient substantially to release the adhering bond therebetween, and thereafter stripping the unitary strip from said one surface.

2. A method of forming a continuous integral strip of a thickness greater than .060 inch from vinyl thermoplastic material, which comprises the steps of feeding thin component strips of said material aggregating a thickness not less than .060 inch longitudinally and simultaneously into and through a bight between and in direct contact with two pressure surfaces to which said material is adherent when heated to a sufficiently high temperature and is sufficiently non-adherent to be stripped therefrom without injury when cooled, pressing the thin strips firmly and progressively into face to face contact at said bight thereby continuously excluding the entrapment of air therebetween while joining them into intimate physical contact, continuing the movement of the combined strips along a predetermined path while holding them in firm face to face contact between said surfaces both of which are heated to temperatures at least sufficiently high to bond the component strips into a unitary strip and at least one surface of which is heated to a temperature sufficiently high to cause adhering of the material thereto, annealing the unitary strip by continuing to maintain it under said heat and pressure through a continuation of said path, continuing the movement of the unitary strip in adhering contact with said one surface through another predetermined path while cooling said one surface and strip sufficient substantially to release the adhering bond therebetween, and thereafter stripping the unitary strip from said one surface.

3. A method of combining into a unitary strip of predetermined thickness a plurality of thin component strips of plastic material adapted to be softened by heat, which comprises the steps of feeding the thin strips longitudinally and simultaneously into and through a bight between and in direct contact with two pressure surfaces to which said material is adherent when heated to a sufficiently high temperature and is sufficiently non-adherent to be stripped therefrom without injury when cooled, pressing the thin strips firmly and progressively into face to face contact at said bight thereby continuously excluding the entrapment of air therebetween while joining them into intimate physical contact, continuing the movement of the combined strips along a predetermined path while holding them in firm face to face contact between said surfaces both of which are heated to a temperature sufficiently high to bond the component strips into a unitary strip and cause adhering thereof to the pressure surfaces, annealing the unitary strip by continuing to maintain it in contact with said surfaces under said heat and pressure through a continuation of said path, continuing the movement of the unitary strip in adhering contact with said two pressure surfaces through another predetermined path while cooling said surfaces and strip sufficient substantially to release the adhering bond therebetween, and thereafter stripping the unitary strip from said surfaces.

4. A continuous method for laminating together and stress-relieving thermoplastic material heat-formed into films, sheeting and the like, which comprises pressure-applying together two or more layers of the thermoplastic material onto an endless moving metal belt heated to a temperature at which the thermoplastic material adheres, heating the thermoplastic material while adhering to the metal belt to a non-decomposing strain-relieving temperature above the heat-forming temperature of the thermoplastic material until a substantial amount of stress removal has occurred, then cooling the laminated structure to a non-plastic condition and then stripping it from the metal belt.

5. A continuous method for removing stresses in thermoplastic materials that have been heat-formed into films, sheeting and the like, which comprises pressure-applying the thermoplastic material onto an endless moving metal belt heated to a temperature at which the thermoplastic material adheres, heating the thermoplastic material while adhering to the metal belt to a non-decomposing stress-relieving temperature and above the heat-forming temperature until the stresses have been substantially removed, cooling to a non-plastic condition and then stripping it from the metal belt.

6. A continuous method of uniting and stress-relieving thin thermoplastic sheets, which comprises pressing together two or more thin sheets possessing internal stresses between opposed moving metal surfaces heated to a temperature at which the thermoplastic material adheres at least to one of them, heating the thermoplastic material while adhering to one of said surfaces to a non-decomposing stress-relieving temperature until a substantial amount of the stress has been removed, then cooling the laminated structure to a substantially non-tacky condition while adhering to one of said metal surfaces, and finally stripping the product from said surface in permanently flat condition.

7. A continuous method for removing stresses in thermoplastic materials that have been heat-formed into sheets, which comprises subjecting a sheet of the thermoplastic material to pressure between moving metal surfaces heated to a temperature at which the thermoplastic material adheres at least to one of them, heating the thermoplastic material while adhering to the said metal surface to a non-decomposing stress-relieving temperature and above the heat-forming temperature of the material until the stresses have been substantially removed, cooling the sheet to a non-tacky condition and then stripping it from the said metal surface in flat condition.

JOHN M. BIERER.

REFERENCES CITED

The following references are of record in the file of this patent:

UNITED STATES PATENTS

| Number | Name | Date |
|---|---|---|
| 2,067,025 | Schmidt | Jan. 5, 1937 |
| 2,069,589 | Meizling et al. | Feb. 2, 1937 |
| 2,179,444 | Bierer | Nov. 7, 1939 |
| 2,236,214 | Jones | Mar. 25, 1941 |
| 2,267,942 | Morse | Dec. 30, 1941 |
| 2,335,190 | Minich | Nov. 23, 1943 |

Certificate of Correction

Patent No. 2,434,541.　　　　　　　　　　　　　　　　　January 13, 1948.

JOHN M. BIERER

It is hereby certified that error appears in the printed specification of the above numbered patent requiring correction as follows: Column 1, line 24, for "0.6" read .06; and that the said Letters Patent should be read with this correction therein that the same may conform to the record of the case in the Patent Office.

Signed and sealed this 30th day of March, A. D. 1948.

[SEAL]

THOMAS F. MURPHY,
*Assistant Commissioner of Patents.* gether and stress-relieving thermoplastic material heat-formed into films, sheeting and the like, which comprises pressure-applying together two or more layers of the thermoplastic material onto an endless moving metal belt heated to a temperature at which the thermoplastic material adheres, heating the thermoplastic material while adhering to the metal belt to a non-decomposing strain-relieving temperature above the heat-forming temperature of the thermoplastic material until a substantial amount of stress removal has occurred, then cooling the laminated structure to a non-plastic condition and then stripping it from the metal belt.

5. A continuous method for removing stresses in thermoplastic materials that have been heat-formed into films, sheeting and the like, which comprises pressure-applying the thermoplastic material onto an endless moving metal belt heated to a temperature at which the thermoplastic material adheres, heating the thermoplastic material while adhering to the metal belt to a non-decomposing stress-relieving temperature and above the heat-forming temperature until the stresses have been substantially removed, cooling to a non-plastic condition and then stripping it from the metal belt.

6. A continuous method of uniting and stress-relieving thin thermoplastic sheets, which comprises pressing together two or more thin sheets possessing internal stresses between opposed moving metal surfaces heated to a temperature at which the thermoplastic material adheres at least to one of them, heating the thermoplastic material while adhering to one of said surfaces to a non-decomposing stress-relieving temperature until a substantial amount of the stress has been removed, then cooling the laminated structure to a substantially non-tacky condition while adhering to one of said metal surfaces, and finally stripping the product from said surface in permanently flat condition.

7. A continuous method for removing stresses in thermoplastic materials that have been heat-formed into sheets, which comprises subjecting a sheet of the thermoplastic material to pressure between moving metal surfaces heated to a temperature at which the thermoplastic material adheres at least to one of them, heating the thermoplastic material while adhering to the said metal surface to a non-decomposing stress-relieving temperature and above the heat-forming temperature of the material until the stresses have been substantially removed, cooling the sheet to a non-tacky condition and then stripping it from the said metal surface in flat condition.

JOHN M. BIERER.

REFERENCES CITED

The following references are of record in the file of this patent:

UNITED STATES PATENTS

| Number | Name | Date |
|---|---|---|
| 2,067,025 | Schmidt | Jan. 5, 1937 |
| 2,069,589 | Meizling et al. | Feb. 2, 1937 |
| 2,179,444 | Bierer | Nov. 7, 1939 |
| 2,236,214 | Jones | Mar. 25, 1941 |
| 2,267,942 | Morse | Dec. 30, 1941 |
| 2,335,190 | Minich | Nov. 23, 1943 |

---

Certificate of Correction

Patent No. 2,434,541.  January 13, 1948.

JOHN M. BIERER

It is hereby certified that error appears in the printed specification of the above numbered patent requiring correction as follows: Column 1, line 24, for "0.6" read .06; and that the said Letters Patent should be read with this correction therein that the same may conform to the record of the case in the Patent Office.

Signed and sealed this 30th day of March, A. D. 1948.

[SEAL]

THOMAS F. MURPHY,
*Assistant Commissioner of Patents.*